No. 637,899. Patented Nov. 28, 1899.
P. T. SIEVERT.
MANUFACTURE OF GLASS ARTICLES.
(Application filed June 28, 1899.)
(No Model.)
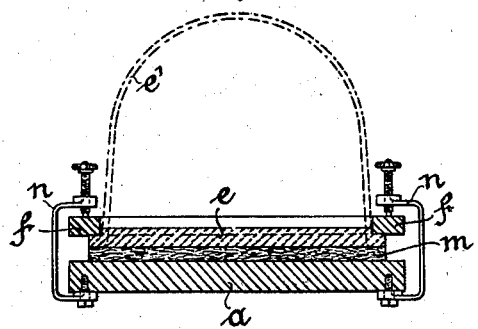
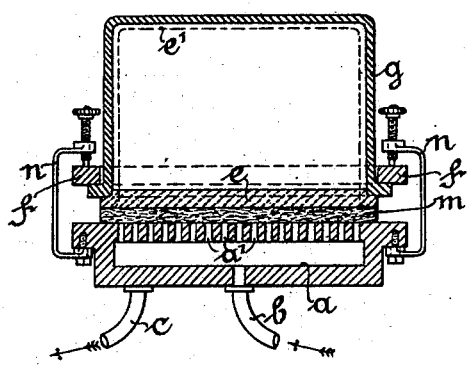
Witnesses:—
Edward Viesen
George Barry Jr
Inventor.
Paul Theodor Sievert
By attorneys
Brown & Seward

UNITED STATES PATENT OFFICE.

PAUL THEODOR SIEVERT, OF DRESDEN, GERMANY.

MANUFACTURE OF GLASS ARTICLES.

SPECIFICATION forming part of Letters Patent No. 637,899, dated November 28, 1899.

Application filed June 28, 1899. Serial No. 722,126. (No specimens.)

*To all whom it may concern:*

Be it known that I, PAUL THEODOR SIEVERT, a subject of the King of Saxony, and a resident of Dresden, Germany, have invented a new and useful Improvement in the Manufacture of Glass Articles, of which the following is a specification.

This improvement relates to a process invented by me for manufacturing hollow glass bodies, which consists in the spreading out of a liquid glass mass into a sheet and the blowing out of that sheet by an elastic pressure medium to the form of the hollow article desired. In such process as originally invented by me the elastic pressure medium was supplied from an outside source.

In the further development of the process I have found that the introduction or the supply of the pressure medium from outside is not necessary in all cases for the formation of the hollow glass articles, and according to my present improvement the generation of such pressure medium is effected by the heat of the molten or plastic glass. This generation of such pressure medium may in a most suitable manner be effected by a moist porous mat, which is put upon a suitable support and upon which mat the hot flat plastic glass layer is put. The porous mat, which may be made of fibrous material, asbestos, textile fiber made incombustible, or such like suitable material, may be put on its support in a moist state for each operation, or it may be moistened by introducing water into the hollow space of the support. From the contact of the hot glass and of the moist mat steam-pressure is generated. The regulation of such steam-pressure for suitably blowing out the flat plastic glass between a shaping-frame or into a mold is effected by more or less pressure exerted by said frame or mold upon or into the plastic layer of glass or upon or into the moist mat. The regulation of the pressure may be effected by the hand of the workman or by mechanical means.

In the accompanying drawings there are represented in vertical section two different examples of apparatus for carrying out this process.

Figure 1 illustrates an apparatus in which the base-plate or support for the porous mat is solid and in which no mold is employed for shaping the glass article; Fig. 2, an apparatus in which the said support is hollow for the introduction of water and in which a mold is employed for shaping the articles.

In Fig. 1, *a* is a solid base-plate, upon which the moist mat or layer *m* of asbestos or other suitable material is put and upon which mat the flat plastic layer of glass *e* is placed. *f* is a shaping-frame encircling the layer of glass and keeping the latter down at its edges. In pressing down the frame upon the glass layer—for instance, by means of a screw-clamp *n*—an inclosure is formed, so that the steam-pressure generated by the contact of the hot glass with the moist mat will blow out the glass within the shaping-frame to the form, say, of a glass shade, as indicated in dotted lines at *e'*.

In Fig. 2 the device is represented with the base-plate *a* hollow and with perforations *a'* in its upper part. The cavity in the plate communicates with the water-supply pipe *b* and the outlet *c*. The moist mat is indicated at *m*, and upon it the flat plastic glass layer *e* is shown. This layer of glass is kept down by the rim of the mold *g*, which rim may be pressed down upon the glass directly or indirectly by means of the frame *f*, and by suitable means, such as screw-clamps *n*, such pressure may be regulated to be more or less heavy.

The admission of water causes the moistening of the fibrous layer *m*, and the rim of the mold being pressed down upon the hot glass steam is generated, causing the blowing of the glass layer into the mold *g*, as indicated in dotted lines at *e'*.

The action of the steam-pressure generated under the glass may be regulated during the operation by applying more or less pressure to the frame *f* by means of the clamps *n*.

The shaping-frames or the molds employed may have blunt or rounded-off rims, or such rims may be sharp-edged, so as to penetrate through the glass into the moist mat. The spreading of the molten glass into a flat layer may take place upon the moist mat. It will, however, be found more convenient to spread out the molten glass upon another support and to equalize it by means of piston or roller pressure, and thereafter quickly remove the thus-prepared flat glass layer from such support onto the moist mat for provoking the generating of steam-pressure and blowing up the glass layer by pressing the shape-giving frame or hollow mold upon the glass.

It is a matter of course that several hollow glass bodies may be produced simultaneously by the described process from one flat glass layer, suitable shaping-frames or molds being provided for the purpose.

Having now particularly described and ascertained the nature of my said invention and in what manner the same is to be performed, I declare that what I claim is—

1. The process for producing hollow glass bodies from a flat layer of hot plastic glass consisting in clamping the edges of said layer and subjecting one side of the so-clamped layer to the pressure of steam generated by the heat of the glass, substantially as herein described.

2. The process for producing hollow glass bodies from a flat layer of hot plastic glass, consisting in clamping the edges of said layer, subjecting one side of the so-clamped layer to the pressure of steam generated by the heat of the glass and regulating the action of said steam-pressure during the formation of the hollow glass body or bodies by more or less pressure on the edges of the hot layer of glass, substantially as herein described.

In testimony that I claim the foregoing as my invention I have signed my name, in presence of two witnesses, this 15th day of June, 1899.

PAUL THEODOR SIEVERT.

Witnesses:
 PAUL ARRAS,
 WILHELM WIESENHÜTTEG.